United States Patent [19]

Wolf et al.

[11] Patent Number: 4,970,103

[45] Date of Patent: Nov. 13, 1990

[54] PREFORMED PART MADE OF PLASTICS WITH INTEGRALLY FORMED RUBBER ELASTIC PARTS

[75] Inventors: Franz J. Wolf, Bad Soden-Salmünster; Peter Kaminski, Gelnhausen, both of Fed. Rep. of Germany

[73] Assignee: WOCO Franz-Josef Wolf & Co., Fed. Rep. of Germany

[21] Appl. No.: 307,172

[22] Filed: Feb. 6, 1989

Related U.S. Application Data

[63] Continuation of Ser. No. 932,219, Nov. 18, 1986, abandoned.

[30] Foreign Application Priority Data

Nov. 26, 1985 [DE] Fed. Rep. of Germany ....... 3541767

[51] Int. Cl.$^5$ ............................................... B32B 3/10
[52] U.S. Cl. ..................................... 428/131; 264/275; 264/276; 428/156; 428/192
[58] Field of Search ................. 428/137, 61, 131, 156, 428/192; 264/264, 269, 275, 276

[56] References Cited

U.S. PATENT DOCUMENTS 3,398,222 8/1968 Kaufman, Jr. et al. ............. 264/276

FOREIGN PATENT DOCUMENTS 2145104 5/1973 Fed. Rep. of Germany ........ 428/61

*Primary Examiner*—Pamela R. Schwartz
*Attorney, Agent, or Firm*—Lowe, Price, LeBlanc, Becker & Shur

[57] ABSTRACT

A preformed part made of plastics material, especially a sheet-like plastics part made by injection molding is formed to be integral with elastic portions. The elastic portions serve as seals, as for feed-through holes in the plastics part. A ring-shaped circular closed protruding edge or ring-shaped rib, formed integrally with the plastics part around the regions to be coated with rubber, limit the region where elastic material is deposited to integrate with the plastics material. An annular region around rib has a radial span around the recesses, bore holes or edges into which the rubber material is injected, and enables insertion of the elastic material despite the presence of differential thermal expansion between the plastic part and a metal forming tool to shape the elastic material.

15 Claims, 1 Drawing Sheet

PREFORMED PART MADE OF PLASTICS WITH INTEGRALLY FORMED RUBBER ELASTIC PARTS

This application is a continuation of application Ser. No. 06/932,219, filed Nov. 18, 1986, now abandoned.

FIELD OF THE INVENTION

This invention relates to a preformed part made of a plastics material that is formed to have integral therewith portions formed of an elastic material. Preformed plastics parts with integral elastic material portions are known from, for example, German patent No. DE 21 45 104 C3, disclosing the function of a cover plate for closing the case of an electric capacitor. Such cover plates or capacitors usually have a diameter in the range of about 2 to 5 cm, i.e., they are relatively small parts. With such small dimensions, there are no serious problems caused by the differences between the linear thermal expansion coefficient of steel (the material of the form tools in which the preformed part made of plastic is coated with the form material) and the linear thermal expansion coefficient of the plastics material of the preformed parts. The linear thermal expansion coefficient of plastics, however, is two to ten times larger than the linear thermal expansion coefficient of steel. This difference is significant when the preformed parts, made of plastics to be coated with rubber or elastic material, have dimensions which are in the range from 7 to 10 cm, e.g., larger cover plates and lids. In such preformed parts having relatively larger dimensions, when feed through-holes that are relatively far apart and relatively small are to be provided with elastic seals, these feed through-holes cannot be formed in satisfactorily due to dimensional inexactness caused by differential thermal expansions.

The object of the invention is to improve the exact limiting of the regions of injection when coating preformed plastics parts with rubber, especially around recessess to be coated with rubber, so that these preformed plastics parts, especially plates and disks with relatively large dimensions, can be coated reliably even if the linear thermal expansion coefficients of the steel form tool and the plastics of the preformed parts differ from one another by as much as an order of magnitude.

The preformed plastics part of interest typically is made by injection moulding and can have any shape, e.g., a block with recesses or bore holes, a case, a part of a case, a tube or a cup. In practice, the preformed part typically will be a plate or disk for sealing or closing cases. Instead of separately formed and inserted sealing elements, such cover plates preferably have sealing elements that are integrally coated with an elastic material that is then vulkanized, especially at bore holes in the plate which provide local sealing. Through such feed through-holes are passed, for example, elongate setting bars, cables or, if the plate is the base of a heat exchanger, the tubes of a tubular heat exchanger. Such preformed parts often have longitudinal extensions in the range of 20 or more centimeters, with diameters of the bore holes only a few millimeters in size and with thicknesses of the profile of the seals adjacent to bore holes in the range of about 1 to 2 mm.

Even with such extreme conditions, durable sealing is provided by the preformed part when formed to have a protruding edge some distance around the holes and edges to be coated with an elastic rubber material. In forming such coated parts, even if the opening of an elastic material feed channel is not located at a geometrically correct place above the region where the rubber seal is to be formed, but instead contacts the surface of the preformed part elsewhere due to differential thermal expansion, the integral ring-shaped protruding edge, being extended radially outward, enables insertion of the pressed-in elastic material into the cavity formed between the form tool and the preformed part for building of the rubber elastic portion thereof without any problems. According to the present state of the art, under such conditions during formation of such parts, there is the danger that the opening of the feed channel that locates, say, at the highest point of the protruding edge, is partially closed by the protruding edge. This leads to damaged or missing rubber coatings, and, accordingly, to useless and damaged products.

In contrast, in the present invention there is a flat ring-shaped cavity in the form of a disk which is between the form tool lying against the upper edge of the integral ring-shaped protruding edge and the surface of the preformed part resting radially inside by the distance to the opening of the channel. This ring-shaped cavity is open to the cavity to be filled with elastic form material, and ensures that the form material, even when it is pressed and inserted above the surface of the preformed part, is able to flow into the cavities of the preformed part intentionally. Formation of product defects caused by thermal inexactness can thus be eliminated reliably.

The distance of the protruding edge to the region to be coated is determined by the difference between the linear thermal expansion coefficient of the material of the form tool and that of the plastics material of the preformed parts, and by the geometrical form in the dimensions of the preformed parts to be coated with rubber. For each special application, a person skilled in the art will be able to predetermine these parameters form tabulated materials property data without performing any experiments. Normally, that distance between the protruding edge and the region to be coated by elastic material will be sufficient which is at least equal to the width of the base of the profile or which is only 3 to 5 times larger than the width of the base of the profile of the protruding edge.

Typically, the distance between the inner edge of the integrally ring-shaped protruding edge from the margin or the edge of the adjacent recess, bore holes or edge of the preformed part, into or onto which the rubber elastic part is to be formed, ranges from about 0.05 to 4 mm, and preferably is in the range from 0.1 to 1 mm.

This distance of the integrally ring-shaped protruding edge or ring-shaped rib from the edge of the recesses of the preformed part to be filled is preferably selected to be at the side of the feed channel or channels for providing the rubber elastic material to be integral with the plastics part. At the sides opposite the feed channel too, the provision of such a distance along separating lines or separating areas between rubber elastic portions and the profile of the preformed parts can be useful, especially if there are profile singularities in the form tool, e.g., channels, ribs or nipples which have to work together with the rubber coating to be formed or which have to influence the coating.

The invention is described hereinbelow with reference to a preferred embodiment.

BRIEF DESCRIPTION OF THE DRAWING

In FIG. 1, there is shown in a highly enlarged but not true to scale longitudinal section a portion of a plastic part 1, made of glass fiber reinforced polyamid by injection molding, in which a bore hole 2 is formed perpendicular to the surface 3 of part 1. With a radial distance 4, there is a circular rib 6 around and adjacent the edge 5 of the bore hole 2, seen in cross-sectional profile in FIG. 1 and integral with plastics part 5. The protruding edge of rib 6 shows a profile decreasing in radial expanse from its base to its upper edge, and in this embodiment is semi-circular in shape. Typically, a width of the base is 0.5 mm and the height of the profile is 0.25 mm. The distance 4 between the radially inner edge 7 of the ring-shaped protruding rib 6 and the edge 5 of the bore hole 2 is typically 0.5 mm, too, in such a case.

Figure 1:
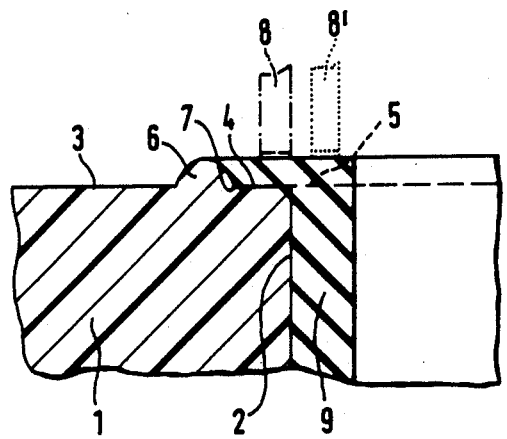
FIG. 1 illustrates in longitudinal section the form of a rubber coating of a bore hole, in a plastic part made by injection moulding, according to this invention.

Through a feed channel 8, indicated by interrupted lines as a portion of a form tool not shown in detail, the elastic material for forming the rubber elastic portion is pressed or injected into a cavity essentially formed by the inner surface of bore hole 2 and by the surfaces of the form tool, not shown in detail in FIG. 1. Furthermore, in FIG. 1 also shown is another location of the feed channel, illustrated by dotted lines and by the reference number 8 (typically steel). Due to differential linear thermal expansion between the form tool not shown in FIG. 1 and the preformed plastic part 1 (typically having a larger linear thermal expansion coefficient than steel), the real location of the feed channel 8 under operating conditions is as illustrated by interrupted lines. With feed channel 8 is not partially or toally closed by the protruding edge of rib 6 but is above the annular area 4, the elastic material 9 inserted by feed channel 8 is able to flow unobstructed over the ring-shaped annular area therebelow. Elastic material 9 thus forms the desired sealing coating of the bore hole 2, into the cavity between the bore hole 2 and the form tool (not shown). In spite of inexactness caused by differential thermal expansions, the radial distance 4 allows for satisfactory formation of the elastic material coating on plastics part 5.

The plastics part 1, typically made by injection moulding, as shown in the figure, may typically be a large cover plate of a capacitor, a cover plate of an accumulator with feed-through contacts, a base plate for a tubular heat exchanger used especially in the automotive industry for the purpose of climating, or a base switch plate with waterproof feed through holes for cables. Common to all the above mentioned exemplary parts is that they have relatively large dimensions, so that the relatively high linear thermal expansion coefficient of plastics compared with that of steel (the usual material for making form tools) into which the rubber seals material is injected and is of significant importance, particularly at the temperatures of the form tool when injecting the elastic material.

To accommodate these inexactnesses, the distance 4 is preferably nearly equal to or even larger than the width of the base of the profile of rib 6, which means the width of the integrally ring-shaped protruding edge 6 at the plane surface 3 of the preformed plastics part 1. When producing smaller parts, the distance 4 can be chosen to be smaller. In every case, to realize the purpose of the invention, the distance so chosen must be large enough so that the inexactness of the relative position of feed channel 8 with respect to the preformed plastics part 1 does not cause the feed channel to be seriously narrowed or closed by the integrally ring-shaped protruding edge of rib 6.

We claim:

1. In a part made of plastic, said part including a section having one of an edge or a hole coated with an elastic material for effective sealing thereat, said elastic material being applied to said section with a tool having a feed channel for feeding said elastic material, the improvement comprising:
   a protruding raised rib extending around said edge or hole, said rib being spaced from said edge or hole by a predetermined distance determined by the difference between the linear thermal expansion coefficient of said plastic and the material of the tool having said elastic material feed channel, said rib confining said elastic material to a zone defined by said raised rib and said edge or hole.

2. The part according to claim 1, wherein the side of said rib facing said edge or hole is covered by said elastic material.

3. The part according to claim 1, wherein said tool is made of steel.

4. A part according to claim 1, wherein:
   said elastic material is applied to contact a portion of a surface of said raised rib defining said zone.

5. A part according to claim 4, wherein:
   said elastic material and said plastics material remain in contact following application of the former to the latter.

6. A part according to claim 5, wherein:
   said elastic material comprises rubber material vulcanized in place following application confined by said raised rib.

7. A part according to claim 4, wherein:
   said predetermined distance is at least equal to the width of said raised rib.

8. A part according to claim 4, wherein:
   said elastic material comprises rubber material vulcanized in place following application confined by said raised rib.

9. A part according to claim 1, wherein:
   said elastic material and said plastics material remain in contact following application of the former to the latter.

10. A part according to claim 9, wherein:
    said elastic material comprises rubber material vulcanized in place following application confined by said raised rib.

11. A part according to claim 9, wherein:
    said predetermined distance is at least equal to the width of said raised rib.

12. A part according to claim 1, wherein:
    said predetermined distance is at least equal to the width of said raised rib.

13. A part according to claim 12, wherein:
    said elastic material comprises rubber material vulcanized in place following application confined by said raised rib.

14. A part according to claim 1, wherein:
    said elastic material comprises rubber material vulcanized in place following application confined by said raised rib.

15. A part according to claim 1, said section including one of a hole, bore and through-hole, and wherein said zone is within a region defined and substantially surrounded by the rib.

* * * * *